US012444930B2

(12) United States Patent
Meng (10) Patent No.: US 12,444,930 B2
(45) Date of Patent: Oct. 14, 2025

(54) PROTECTION CIRCUIT AND VEHICLE-MOUNTED DEVICE WITH THE SAME

(71) Applicant: Alps Alpine Co., LTD., Tokyo (JP)

(72) Inventor: Qinggeng Meng, Dalian (CN)

(73) Assignee: Alps Alpine Co., LTD., Tokyo (JP)

( * ) Notice: Subject to any disclaimer, the term of this patent is extended or adjusted under 35 U.S.C. 154(b) by 196 days.

(21) Appl. No.: 18/140,924

(22) Filed: Apr. 28, 2023

(65) Prior Publication Data

US 2023/0361558 A1 Nov. 9, 2023

(30) Foreign Application Priority Data

May 9, 2022 (CN) .......................... 202210498360.3

(51) Int. Cl.
*H02H 9/02* (2006.01)
(52) U.S. Cl.
CPC .................................... *H02H 9/02* (2013.01)
(58) Field of Classification Search
CPC ............ H02H 9/02; H02H 9/04; H02H 9/046; H02H 9/042; H02H 9/045; H02H 9/00
USPC ........................................ 361/56, 91.1, 111
See application file for complete search history.

(56) References Cited

U.S. PATENT DOCUMENTS

| 2005/0201031 A1* | 9/2005 | Furuta ................. H01L 25/0655 361/91.1 |
| 2006/0103421 A1* | 5/2006 | Hirata ................. H01L 27/0292 257/E23.079 |
| 2013/0063843 A1* | 3/2013 | Chen .................... H01L 25/0655 361/56 |
| 2021/0098987 A1* | 4/2021 | Walimbe ............. H01L 27/0292 |
| 2022/0286136 A1* | 9/2022 | Cherif ........................ G06F 1/10 |

FOREIGN PATENT DOCUMENTS

| JP | H09-293836 | 11/1997 |
| JP | 2007-123931 | 5/2007 |
| JP | 4037363 | 1/2008 |

\* cited by examiner

*Primary Examiner* — Danny Nguyen
(74) *Attorney, Agent, or Firm* — Crowell & Moring LLP (57) ABSTRACT

Disclosed is a protection circuit of a vehicle-mounted device. Forms of a protection circuit may include a first substrate provided with a first circuit connected to a power line and a potential reference line; a second substrate provided with a second circuit connected to the power line and the potential reference line; a connecting part including a potential reference connecting line for connecting between the potential reference line of the first substrate and the potential reference line of the second substrate and a communication connecting line for connecting between a communication line of the first circuit and a communication line of the second circuit; and a current limiting unit disposed between a first node on the potential reference line of the first substrate at the connecting part side and a second node on the potential reference line of the first substrate at the first circuit side.

8 Claims, 7 Drawing Sheets

PROTECTION CIRCUIT AND VEHICLE-MOUNTED DEVICE WITH THE SAME

RELATED APPLICATION

The present application claims priority to Chinese Patent Application Number 202210498360.3, filed May 9, 2022, the entirety of which is hereby incorporated by reference.

BACKGROUND

1. Field of the Disclosure

The present disclosure relates to a protection circuit and a vehicle-mounted device with the same.

2. Description of the Related Art

In existing circuit designs, for a circuit substrate, a ground wire is usually provided as a potential reference line. A function of the circuit substrate may not be realized when the ground wire is disconnected, but doing so does not usually cause damage to the circuit elements mounted on the circuit substrate.

In addition, in some circuit designs, there are usually a plurality of circuit substrates in one device with multiple ground wires and power supplies at the same time. Under such circumstances, when one ground wire is disconnected, the circuit elements connected to the ground wire will be connected to another ground wire, and as a result, a function of the circuit substrate may not be realized, possibly leading to destruction of the circuit elements. Therefore, it is desirable during circuit design to design a protection circuit to ensure that circuit elements are not destroyed. In addition, it is sometimes desirable to ensure that the function of the circuit substrate can be restored when the ground wire is reconnected after being disconnected.

SUMMARY

In view of this, the present disclosure provides a protection circuit and a vehicle-mounted device provided with the protection circuit, which can achieve the effect that circuit elements are not damaged when a ground wire is disconnected, and the function of a circuit substrate can be restored when the ground wire is reconnected after being disconnected.

The present disclosure provides a protection circuit. In some forms, a protection circuit includes a first substrate provided with a first circuit connected to a power line and a potential rand reference line; a second substrate provided with a second circuit connected to the power line and the potential reference line; a connecting part including a potential reference connecting line configured to provide a connection between the potential reference line of the first substrate and the potential reference line of the second substrate and a communication connecting line configured to provide a connection between a communication line of the first circuit and a communication line of the second circuit; and a current limiting unit disposed between a first node on the potential reference line of the first substrate at the connecting part side and a second node on the potential reference line of the first substrate at the first circuit side.

In some implementations, the protection circuit provided by the present disclosure further includes a communication line protection unit configured to limit voltages applied to the communication line of the first circuit and the communication line of the second circuit when current limiting is conducted by the current limiting unit.

In some implementations, the current limiting unit includes a damping resistor or a damping resistor and a capacitor connected in parallel with the damping resistor.

In some implementations, the current limiting unit is connected in series with the potential reference connecting line.

In some implementations, the communication line protection unit includes a first switching unit and a second switching unit, one end of each of the first switching unit and the second switching unit being connected to the potential reference connecting line and another end of each of the first switching unit and the second switching unit being connected to the communication connecting line, the one end of the first switching unit and the one end of the second switching unit each being connected to a respective end of the current limiting unit.

In some implementations, the communication line protection unit further includes a resistor connected to the communication connecting line between the other end of the first switching unit and the other end of the second switching unit.

In some implementations, the first switching unit includes a first switching element and a first diode connected in series with the first switching element, and the second switching unit includes a second switching element and a second diode connected in series with the second switching element.

In some implementations, the first switching element and the second switching element are transistors, and the first diode and the second diode are Zener diodes.

In some implementations, a gate electrode of the first switching element is connected to the potential reference connecting line at one end of the damping resistor, a source electrode of the first switching element is connected to the potential reference connecting line at another end of the damping resistor, and a drain electrode of the first switching element is connected to the communication connecting line via the first diode; a gate electrode of the second switching element is connected to the potential reference connecting line at the other end of the damping resistor, a source electrode of the second switching element is connected to the potential reference connecting line at the one end of the damping resistor, and a drain electrode of the second switching element is connected to the communication connecting line via the second diode; the first diode is forward connected between the drain electrode of the first switching element and the communication connecting line; and the second diode is forward connected between the drain electrode of the second switching element and the communication connecting line.

In some implementations, a vehicle-mounted device provided by the present disclosure is provided with the protection circuit of any one described above.

According to forms of the protection circuit and the vehicle-mounted device provided with the protection circuit provided by the present disclosure, it is possible to achieve the effects that circuit elements are not damaged when a ground wire is disconnected, and the function of a circuit substrate can be restored when the ground wire is reconnected after being disconnected.

BRIEF DESCRIPTION OF THE DRAWINGS

FIGS. 1A to 1C are schematic diagrams of one form of a vehicle-mounted device of the present disclosure, where

DETAILED DESCRIPTION

Embodiments and implementations of the present disclosure will be described in combination with the accompanying drawings hereinafter.

The drawings are schematic or conceptual, and the dimensions of various components are not necessarily the same as those in reality. Even if the parts are identical, there are cases where they are represented with different size or scale according to the accompanying drawings.

In the description and the drawings of the present application, the same signs and line types are marked for the same parts as those already illustrated, and detailed descriptions are omitted where appropriate.

First Embodiment

Hereinafter, a vehicle-mounted device and its protection circuit according to a first embodiment of the present disclosure will now be described with reference to FIGS. 1A to 4.

Figure 1A:
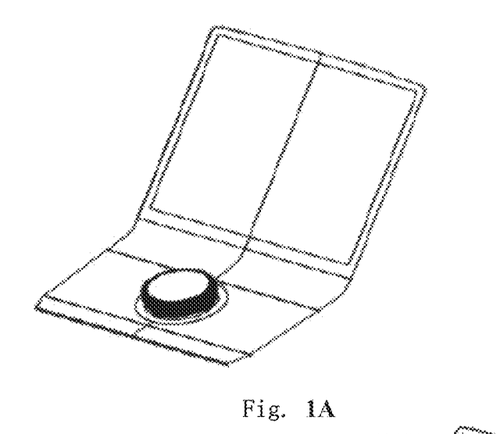
FIG. 1A is a perspective view of the vehicle-mounted device of the present disclosure.
Figure 1B:
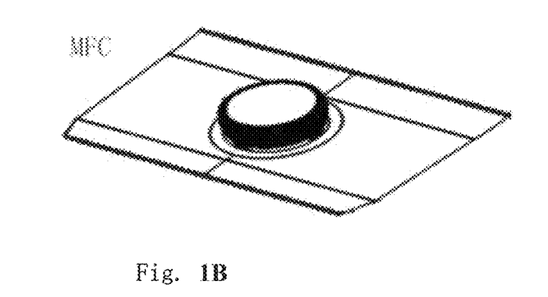
FIGS. 1B and 1C are exploded perspective views of the vehicle-mounted device of the present disclosure.
Figure 1C:
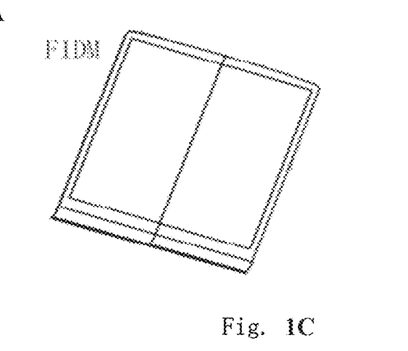

FIGS. 1A to 1C are schematic diagrams of a vehicle-mounted device of the present disclosure, where FIG. 1A is a perspective view of the vehicle-mounted device of the present disclosure, and FIGS. 1B and 1C are exploded perspective views of the vehicle-mounted device of the present disclosure.

Figure 2A:
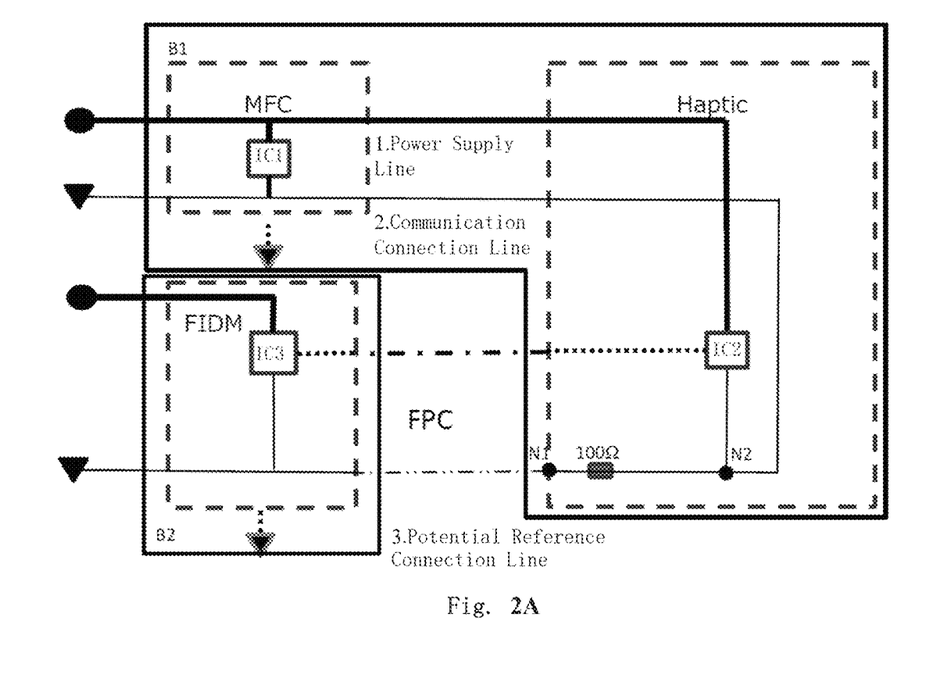
FIGS. 2A to 2C are schematic diagrams of a protection circuit of the vehicle-mounted device according to a first embodiment of the present disclosure.
Figure 2B:
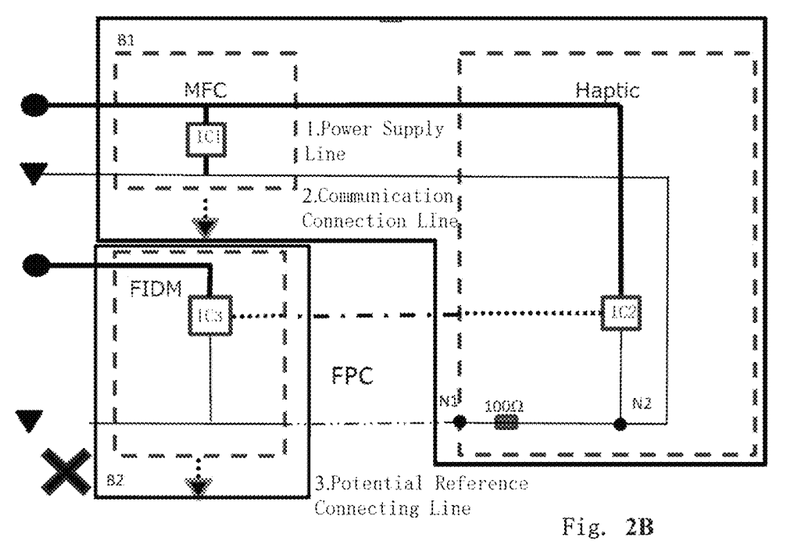
Figure 2C:
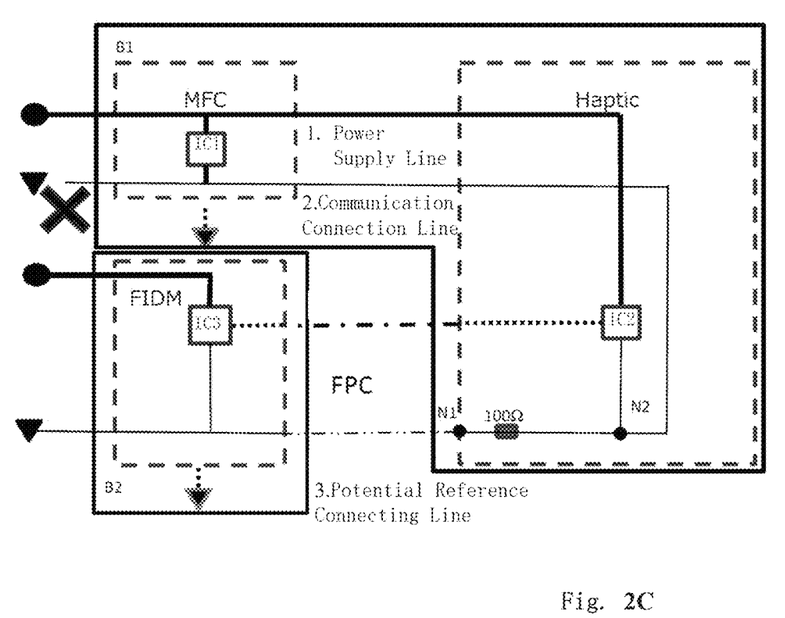
Figure 3:
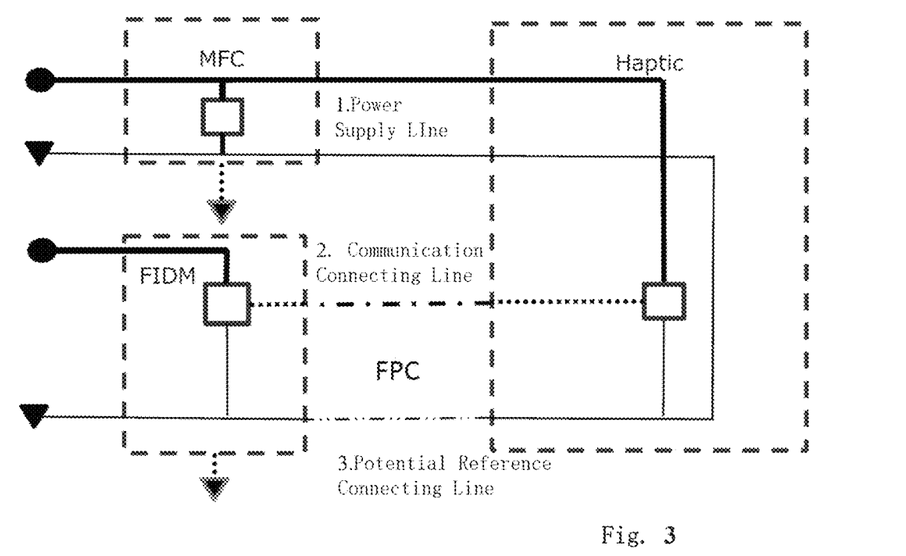
FIG. 3 is a schematic diagram of one embodiment of a protection circuit of a comparative example.
Figure 4:
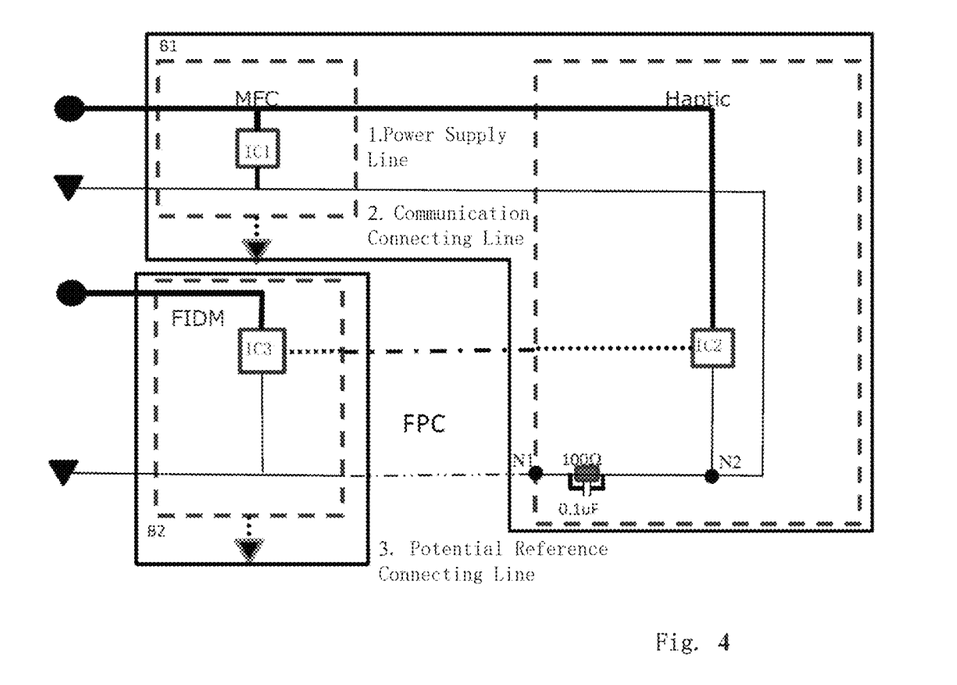
FIG. 4 is a schematic diagram of a modified example of the protection circuit of the vehicle-mounted device according to the first embodiment of the present disclosure.

FIGS. 2A to 2C are schematic diagrams of a protection circuit of the vehicle-mounted device according to the first embodiment of the present disclosure. FIG. 3 is a schematic diagram of one embodiment of a protection circuit of a comparative example. FIG. 4 is a schematic diagram of a modified example of the protection circuit of the vehicle-mounted device according to the first embodiment of the present disclosure.

A vehicle-mounted device of the present disclosure shown in FIGS. 1A to 1C has an operation control function and a display function. The component shown in FIG. 1B includes a knob for operation and an MFC (Multi-Function Controller), which can be used to achieve the operation control function. The component shown in FIG. 1C includes a display screen (e.g., a touch panel) and a FIDM (Fully Integrated Display Module), which can be used to implement display functions.

In addition, the vehicle-mounted device of the present disclosure shown in FIG. 1A also has a screen vibration function, that is, when the display screen shown in FIG. 1C is touched, the display screen vibrates to give feedback and prompt. In addition, the component shown in FIG. 1C also includes a touch vibration function control substrate (haptic substrate) which can be used to implement the screen vibration function.

FIGS. 2A to 2C are schematic diagrams of a protection circuit of the vehicle-mounted device according to the first embodiment of the present disclosure. In the drawings, thick solid lines represent power lines, thin solid lines represent potential reference lines, dotted lines represent communication lines, small solid line frames represent circuits, large solid circles represent power sources, solid inverted triangles represent grounding, and small solid circles represent nodes. In this embodiment, the power lines are wires that can withstand high current and are used to transmit power. Communication lines are used to transmit data and signals.

As shown in FIGS. 2A to 2C, the power line (thick solid line) and a potential reference line (thin solid line) are connected to the MFC, and the MFC is connected to the haptic substrate through the power line and the potential reference line. The MFC receives power from a power source, such as a vehicle-mounted battery, and supplies power to the haptic substrate through the power line. In addition, MFC and haptic substrate share the potential reference lines. Thus, the MFC having the circuit IC1 and the haptic substrate having the first circuit IC2 can be equivalent to one circuit substrate, which corresponds to the first substrate B1 (shown in the "L" shaped solid rectangular frame in the drawings).

In addition, the FIDM is connected with the power supply line and the potential reference line, and has a second circuit IC3. The FIDM corresponds to the second substrate B2 (shown in a solid rectangular frame at the lower left in the drawings). The FIDM is connected to the haptic substrate through a FPC (Flexible Printed Circuit) as a connecting part.

The circuit IC1, the first circuit IC2, and the second circuit IC3 may be, for example, a chip, a circuit including a chip, or the like.

As shown in FIGS. 2A to 2C, the FPC as a connecting part includes a potential reference connecting line (a double-dash line) for connecting between the potential reference line of the first substrate B1 and the potential reference line of the second substrate B2 and a communication connecting line (a single-dash line) for connecting between a communication line of a first circuit IC2 and a communication line of a second circuit IC3. Specifically, the communication connecting line of the FPC connects the communication line (the dot line in the FIDM frame) of the second circuit IC3 provided in the FIDM with the communication line (the dot line in the haptic frame) of the first circuit IC2 provided in the haptic substrate. The potential reference connecting line of the FPC connects the potential reference line (thin solid line in the FIDM frame) of the FIDM with the potential reference line (thin solid line in the haptic frame) of the haptic substrate.

In addition, the protection circuit of the vehicle-mounted device according to the first embodiment of the present disclosure includes a damping resistor, serving as a current limiting unit, connected between a first node N1 on the potential reference line of the first substrate B1 at the FPC side and the second node N2 on the potential reference line of the first substrate B1 at the first circuit side. That is, the damping resistor is arranged on the potential reference line and connected in series with the potential reference connecting line. In this embodiment, the damping resistor is set to 100 ohms, but not limited thereto, and the damping resistor can be set to any other values according to the design parameters of the circuit.

Hereinafter, the operation of the protection circuit of the vehicle-mounted device according to the first embodiment of the present disclosure will be described.

FIG. 2A shows a state of the protection circuit of the vehicle-mounted device according to the first embodiment of the present disclosure when it is normally operated. In normal operation, the first node N1 and the second node N2 are both at reference potentials, and no current flows between the first node N1 and the second node N2 so that there is no voltage difference. All components of the protection circuit operate normally.

FIG. 2B shows a state where the potential reference line of the protection circuit of the vehicle-mounted device according to the first embodiment of the present disclosure at the FIDM side is disconnected and the circuit is disconnected. When the potential reference line at the FIDM side is disconnected, the current flowing out of the power supply of the second substrate B2 cannot be grounded through the potential reference line at the FIDM side, but is grounded through the potential reference line on the first substrate B1 via the FPC, that is, the potential reference line at the MFC side. Since the damping resistor which plays a role in limiting current is connected between the first node N1 and the second node N2, no high current will flow in the FPC, thereby preventing the FPC from being damaged due to the burning of the potential reference connecting line.

FIG. 2C shows a state where the potential reference line of the protection circuit of the vehicle-mounted device according to the first embodiment of the present disclosure at the MFC side is disconnected and the circuit is disconnected. When the potential reference line at the MFC side is disconnected, the current flowing out of the power supply of the first substrate B1 cannot be grounded through the potential reference line at the MFC side, but is grounded through the potential reference line on the second substrate B2 via the FPC, that is, the potential reference line at the FIDM side. Since the damping resistor which plays a role in limiting current is connected between the first node N1 and the second node N2, no high current will flow in the FPC, thereby preventing the FPC from being damaged due to the burning of the potential reference connecting line.

Comparative Example

A comparative example for comparing with the present disclosure will be described below with reference to FIG. 3.

As shown in FIG. 3 the protection circuit of the comparative example differs from the protection circuit of the vehicle-mounted device according to the first embodiment of the present disclosure shown in FIG. 2A in that no damping resistor is provided.

In the protection circuit of the comparative example shown in FIG. 3, when the potential reference line at the FIDM side is disconnected, the current flowing from the power supply of the second substrate cannot be grounded through the potential reference line at the FIDM side, but is grounded through the potential reference line on the first substrate via the FPC. In this way, a high current will flow on the FPC, which may cause the FPC to burn out.

On the other hand, in the protection circuit of the comparative example shown in FIG. 3, when the potential reference line at the MFC side is disconnected, the current flowing from the power supply of the first substrate cannot be grounded through the potential reference line at the MFC side, but is grounded through the potential reference line on the second substrate via the FPC. In this way, a high current will flow on the FPC, which may cause the FPC to burn out.

Thus, with the protection circuit of the vehicle-mounted device according to the first embodiment of the present disclosure, it is possible to limit the current flowing through the FPC, prevent the FPC from being burnt out due to excessive current, and achieve the effect that the function of the circuit board can be restored when the ground wire is reconnected after being disconnected by arranging the damping resistor between the first node N1 on the potential reference line of the first substrate B1 at the connecting part side and the second node N2 on the potential reference line of the first substrate B1 at the first circuit IC3 side.

Modified Example

A modified example of the protection circuit of the vehicle-mounted device according to the first embodiment of the present disclosure will be described below with reference to FIG. 4.

As shown in FIG. 4, the protection circuit of the modified example differs from the protection circuit of the vehicle-mounted device according to the first embodiment of the present disclosure shown in FIG. 2A in that a capacitor is connected in parallel with the damping resistor between the first Node N1 and the second Node N2. In this embodiment, the capacitance is set to 0.1 μF, but it is not limited to this. The capacitance can be set to any other values according to the design parameters of the circuit.

The operation of the protection circuit of the modified example shown in FIG. 4 is the same as that of the protection circuit of the vehicle-mounted device of the first embodiment shown in FIGS. 2A to 2C.

Therefore, the protection circuit of the modified example also has the effect of the protection circuit of the vehicle-mounted device according to the first embodiment described above. In addition, since a capacitor is connected in parallel with the damping resistor between the first node N1 and the second node N2, it is possible to filter an impact component of the alternating current power flowing through, so that the protection circuit has a strong anti-interference capability and improved environmental adaptability.

Second Embodiment

Hereinafter, the protection circuit of the vehicle-mounted device according to a second embodiment of the present disclosure will be described with reference to FIGS. 5A to 5C, which are schematic diagrams of a protection circuit of a vehicle-mounted device according to the second embodiment of the present disclosure.

Figure 5A:
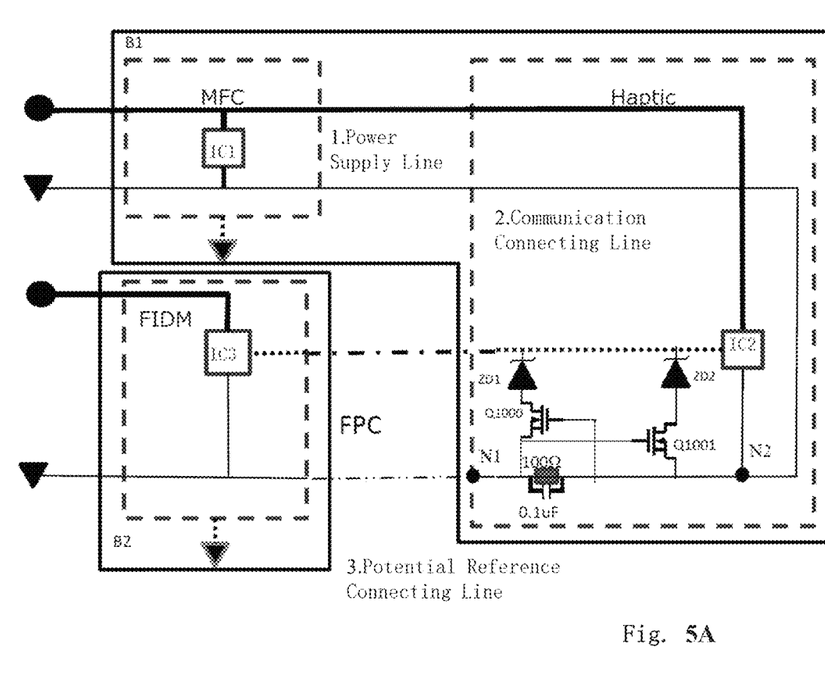
FIGS. 5A to 5C are schematic diagrams of a protection circuit of a vehicle-mounted device according to a second embodiment of the present disclosure.

As shown in FIG. 5A, the protection circuit of the second embodiment differs from the protection circuit of the vehicle-mounted device of the modified example of the first embodiment of the present disclosure shown in FIG. 4 in that a communication line protection unit is added, which limits the voltage applied to the communication line of the first circuit IC2 and the communication line of the second circuit IC3 when the current is limited by the damping resistor as the current limiting unit. This eliminates the effect that the potential of the potential reference line is unintentionally raised by the additional current limiting unit.

As shown in FIG. 5A, the communication line protection unit includes a first switching unit and a second switching unit each having one end connected to the potential reference connecting line and another end connected to the communication connecting line. In addition, one end of the first switching unit and one end of the second switching unit are each connected to a respective end of the current limiting unit.

In addition, the first switching unit includes a first switching element Q1000 and a first diode ZD1 connected in series with the first switching element, and the second switching unit includes a second switching element Q1001 and a second diode ZD2 connected in series with the second switching element.

In addition, it is provided herein that a gate electrode of the first switching element Q1000 is connected to the potential reference connecting line at one end of the damping resistor, a source electrode of the first switching element Q1000 is connected to the potential reference connecting line at another end of the damping resistor, and a drain electrode of the first switching element Q1000 is connected to the communication connecting line via the first diode ZD1.

In addition, it is provided herein that a gate electrode of the second switching element Q1001 is connected to the potential reference connecting line at the other end of the damping resistor, a source electrode of the second switching element Q1001 is connected to the potential reference connecting line at the one end of the damping resistor, and a drain electrode of the second switching element Q1001 is connected to the communication connecting line via the second diode ZD2.

In addition, in this example, the first switching element and the second switching element are, for example, FET transistors, and the first diode and the second diode are Zener diodes.

Hereinafter, the operation of the protection circuit of the vehicle-mounted device according to the second embodiment of the present disclosure will be described.

FIG. 5A shows a state of the protection circuit of the vehicle-mounted device according to the second embodiment of the present disclosure when it is normally operated. In normal operation, the first node N1 and the second node N2 are both at ground potentials, and there is no current flowing through the current limiting resistor between the first node N1 and the second node N2, so there is no voltage difference between the two sides of the resistor. Therefore, both the first switching element Q1000 and the second switching element Q1001 are disconnected. In this case, the protection circuit of the vehicle-mounted device according to the second embodiment operates normally in the same manner as the protection circuit shown in FIG. 4. There will be no voltage disconnection on the communication line.

Figure 5B:
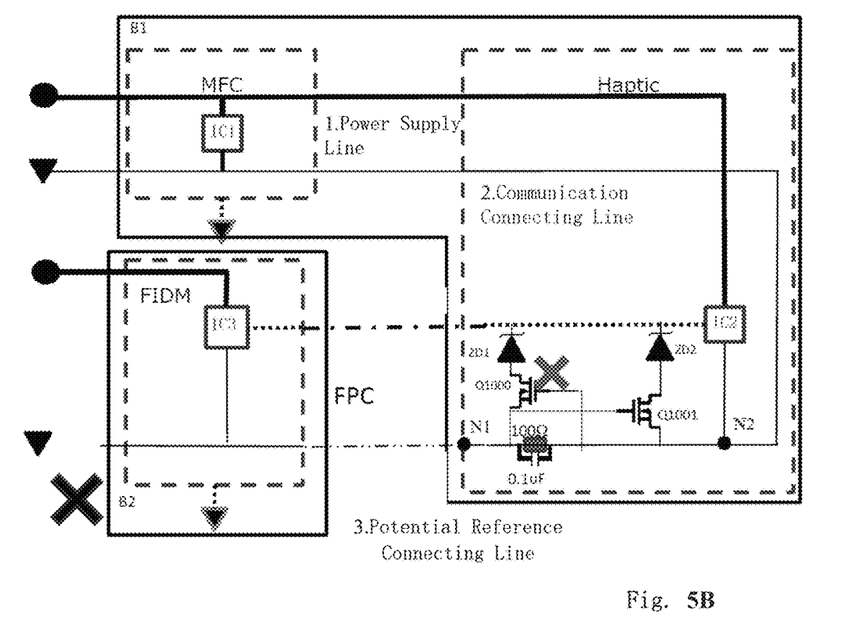

FIG. 5B shows a state where the potential reference line of the protection circuit of the vehicle-mounted device according to the second embodiment of the present disclosure at the FIDM side is disconnected and the circuit is disconnected. When the potential reference line on the FIDM side is disconnected, the current flowing out of the power supply of the second substrate B2 cannot be grounded through the potential reference line at the FIDM side, but is grounded through the potential reference line on the first substrate B1 via the FPC, that is, the potential reference line at the MFC side. Since the damping resistor is connected between the first node N1 and the second node N2, the potential of the first node N1 is not zero due to the voltage difference caused by the damping resistor and is higher than the potential of the second node N2 when a current flows. Thus, the first switching element Q1000 is disconnected, the second switching element Q1001 is connected, and the second diode ZD2, which is connected forward to the drain electrode of the second switching element Q1001, is connected. With the effect of the constant voltage of the second diode ZD2, the voltage on the communication line is constant, and the influence that the voltage on the communication line is raised due to the damping resistor is eliminated. Therefore, a high current will not flow on the FPC, and the FPC can be prevented from being burnt out. The present disclosure can avoid the voltage rise of the communication line, thereby avoiding the destruction of the components on the communication connecting line at the FIDM side.

Figure 5C:
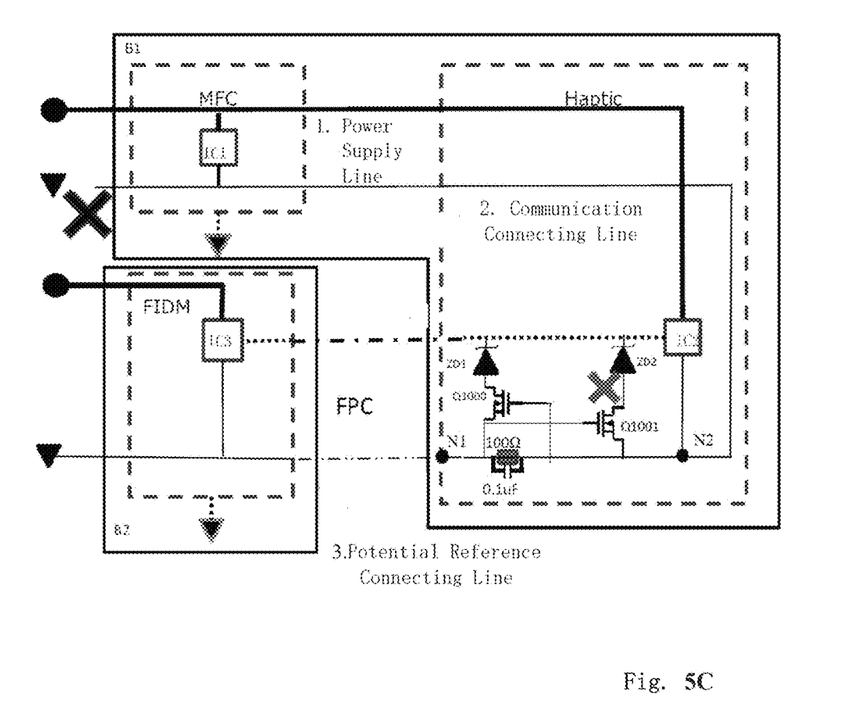

FIG. 5C shows a state where the potential reference line of the protection circuit of the vehicle-mounted device according to the second embodiment of the present disclosure at the MFC side is disconnected and the circuit is disconnected. When the potential reference line at the MFC side is disconnected, the current flowing out of the power supply of the first substrate B1 cannot be grounded through the potential reference line at the MFC side, but is grounded through the potential reference line on the second substrate B2 via the FPC, that is, the potential reference line at the FIDM side. Since the damping resistor is connected between the first node N1 and the second node N2, the potential of the second node N2 is not zero due to the voltage difference caused by the damping resistor and is higher than the potential of the first node N1 when a current flows. Thus, the first switching element Q1000 is connected, the second switching element Q1001 is disconnected, and the first diode ZD1, which is connected forward to the drain electrode of the first switching element Q1000, is connected. With the effect of the constant voltage of the first diode ZD1, the voltage on the communication line is constant, and the influence that the voltage on the communication line is raised due to the damping resistor is eliminated. Therefore, a high current will not flow on the FPC, and the FPC can be prevented from being burnt out. The present disclosure can avoid the voltage rise of the communication line, thereby avoiding the destruction of the components on the communication connecting line at the first substrate B1 side.

Thus, the protection circuit of the vehicle-mounted device according to the second embodiment of the present disclosure also achieves the effect of the protection circuit of the vehicle-mounted device according to the first embodiment and its modified example. Further, since a communication line protection unit is added, the communication line protection unit limits the voltage applied to the communication line of the first circuit IC2 and the communication line of the second circuit IC3 when the current is limited by the damping resistor as the current limiting unit. Therefore, the voltage on the communication line is constant, and the influence that the voltage on the communication line is raised due to the damping resistor is eliminated. Therefore, a high current does not flow to the FPC, and the FPC can be prevented from being damaged due to burnout of the potential reference connecting line.

Modified Example

As described in the second embodiment, the influence that the voltage on the communication line is raised due to the damping resistor is eliminated by the voltage stabilizing effect of the first diode ZD1 or the second diode ZD2. When the voltage stabilizing capability of the first diode ZD1 or the second diode ZD2 is sufficiently strong and the current flowing through the communication line is less than the upper limit value of the capacity of the voltage stabilizing tube, the influence that the voltage on the communication line is raised due to the damping resistor can be fully eliminated. However, when the first diode ZD1 or the second diode ZD2 has weak voltage stabilization capability and the upper limit value of the capability is less than the current flowing through the communication line, the influence of voltage rise on the communication line caused by the damping resistor cannot be fully eliminated. With the protection circuit according to a modified example of the second embodiment described below, it is possible to properly stabilize the voltage even when the voltage stabilizing capability of the first diode ZD1 or the second diode ZD2 is weak, thereby sufficiently eliminating the influence of voltage elevation on the communication line caused by the damping resistor.

Hereinafter, the protection circuit of the vehicle-mounted device according to a modified example of the second embodiment of the present disclosure will be described with reference to FIGS. 6A to 6C, which are schematic diagrams of the protection circuit of the vehicle-mounted device according to the modified example of the second embodiment of the present disclosure.

Figure 6A:
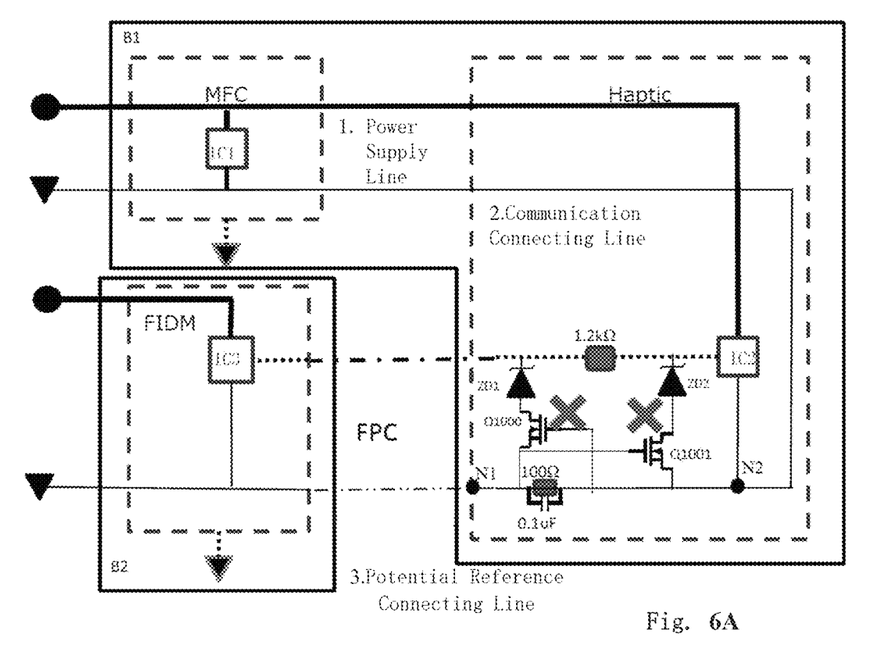
FIGS. 6A to 6C are schematic diagrams of the protection circuit of the vehicle-mounted device according to a modified example of the second embodiment of the present disclosure.

As shown in FIG. 6A, the protection circuit of the modified example of the second embodiment differs from the protection circuit of the vehicle-mounted device of the second embodiment of the present disclosure shown in FIG. 5A in that the communication line protection unit includes the first switching unit and the second switching unit each having the one end connected to the potential reference connecting line and the other end connected to the communication connecting line, and also includes a resistor connected to the communication connecting line between the other end of the first switching unit and the other end of the second switching unit. In this embodiment, the resistor is set to 1.2 kiloohms, but not limited thereto, and the resistor can be set to any other values according to the design parameters of the circuit. The resistor is designed so as to have an almost negligible effect on the current flowing through the communication line.

Hereinafter, the operation of the protection circuit of the vehicle-mounted device according to the modified example of the second embodiment of the present disclosure will be described.

FIG. 6A shows a state of the protection circuit of the vehicle-mounted device according to the modified example of the second embodiment of the present disclosure when it is normally operated. In normal operation, the first node N1 and the second node N2 are both at grounding potentials, and no current flows between the first node N1 and the second node N2 so that there is no voltage difference. Therefore, both the first switching element Q1000 and the second switching element Q1001 are disconnected. In this case, a resistance is connected in series on the communication line, but the resistance is designed to have almost negligible influence on the current flowing through the communication line, so it will not affect the normal operation of the protection circuit of the vehicle-mounted device, that is, the protection circuit of the vehicle-mounted device can work stably.

Figure 6B:
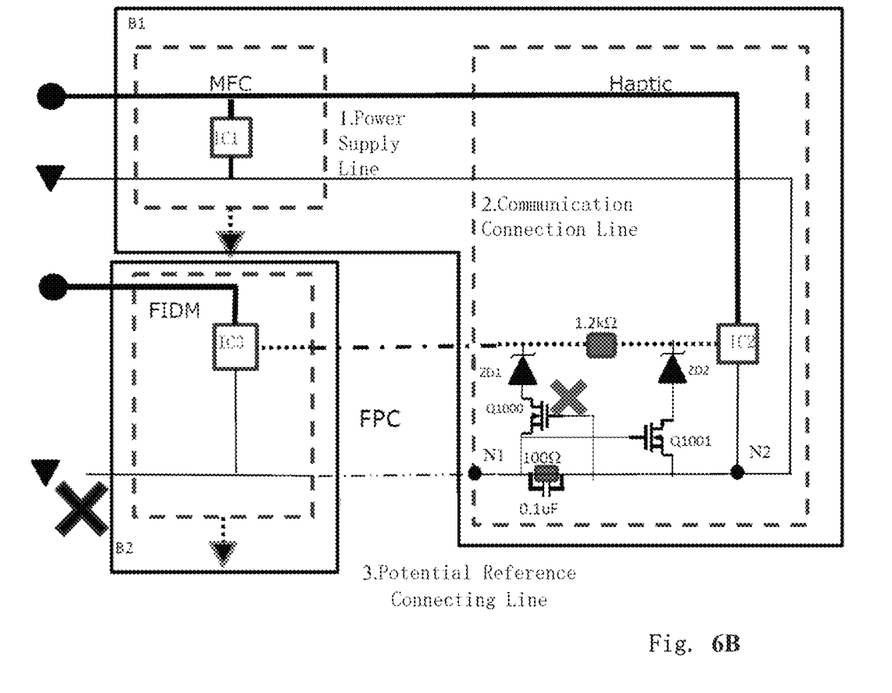

FIG. 6B shows a state in which a potential reference line at the FIDM side of a protection circuit of a vehicle-mounted device according to a modified example of the second embodiment of the present disclosure is disconnected and the circuit is disconnected. When the potential reference line at the FIDM side is disconnected, the current flowing out of the power supply of the second substrate B2 cannot be grounded through the potential reference line at the FIDM side, but is grounded through the potential reference line on the first substrate B1 via the FPC. Since the damping resistor is connected between the first node N1 and the second node N2, the potential of the first node N1 is not zero due to the voltage difference caused by the damping resistor and is higher than the potential of the second node N2 when a current flows. Thus, the first switching element Q1000 is disconnected, the second switching element Q1001 is connected, and the second diode ZD2, which is connected forward to the drain electrode of the second switching element Q1001, is connected. With the effect of the constant voltage generated by the cooperation of the second diode ZD2 and the resistor in series on the communication line, the voltage on the communication line is constant, and the influence that the voltage on the communication line is raised due to the damping resistor is eliminated. Therefore, a high current does not flow to the FPC, and the FPC can be prevented from being damaged due to burnout of the potential reference connecting line.

Figure 6C:
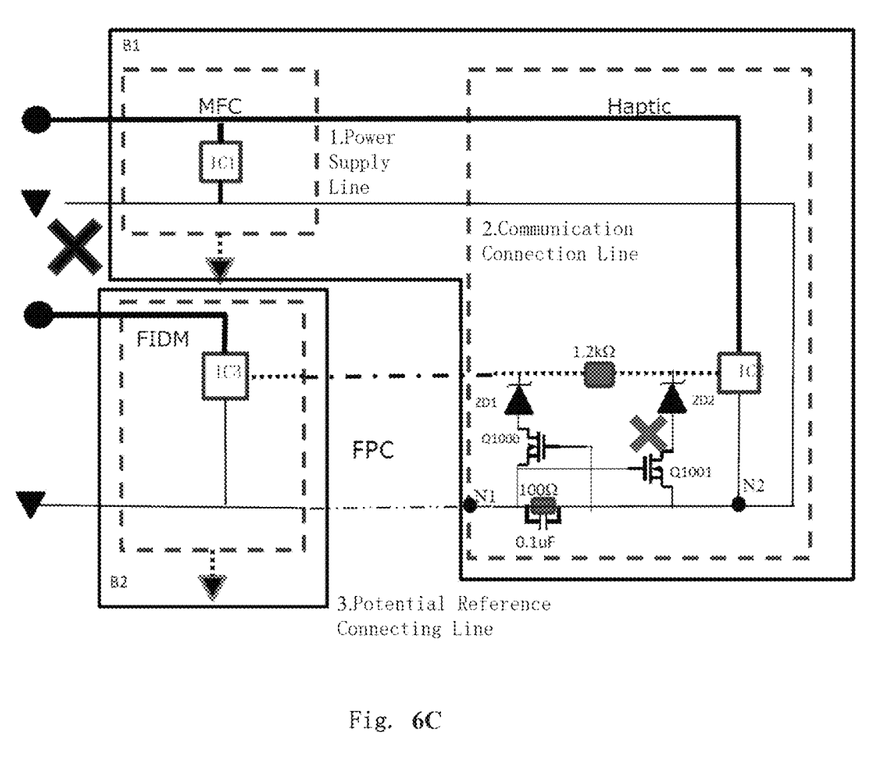

FIG. 6C shows a state where the potential reference line of the protection circuit of the vehicle-mounted device according to the modified example of the second embodiment of the present disclosure at the MFC side is disconnected and the circuit is disconnected. When the potential reference line at the MFC side is disconnected, the current flowing out of the power supply of the first substrate B1 cannot be grounded through the potential reference line at the MFC side, but is grounded through the potential reference line on the second substrate via the FPC. Since the damping resistor is connected between the first node N1 and the second node N2, the potential of the second node N2 is not zero due to the voltage difference caused by the damping resistor and is higher than the potential of the first node N1 when a current flows. Thus, the first switching element Q1000 is connected, the second switching element Q1001 is disconnected, and the first diode ZD1, which is connected forward to the drain electrode of the first switching element Q1000, is connected. With the effect of the constant voltage generated by the cooperation of the first diode ZD1 and the resistor in series on the communication line, the voltage on the communication line is constant, and the influence that the voltage on the communication line is raised due to the damping resistor is eliminated. Therefore, a high current does not flow to the FPC, and the FPC can be prevented from being damaged due to burnout of the potential reference connecting line.

Thus, the protection circuit of the vehicle-mounted device according to the modified example of the second embodiment of the present disclosure also has the effect of the protection circuit of the vehicle-mounted device according to the first embodiment and its modified example and the second embodiment as described above. In addition, a resistor is added to the communication line protection unit, and in cooperation with the first diode ZD1 or the second diode ZD2, the resistor fully exerts the voltage stabilizing function, so that the voltage on the communication line is constant, and the influence of the voltage on the communication line being raised due to the damping resistor is eliminated.

Other Modified Examples

In the above, several embodiments and modified examples of the present disclosure have been illustrated, but these embodiments are presented as examples and are not intended to limit the scope of the present disclosure. These new embodiments can be implemented in various other ways, and various omissions, substitutions, changes, etc. can be made without departing from the subject matter of the present disclosure. These embodiments or variations thereof are included within the scope or subject matter of the present disclosure and within the scope of the present disclosure and its equivalents as set forth in the claims. The embodiments can be implemented in combination with each other.

For example, in the above embodiments and modified examples, both the damping resistor and the resistance added to the communication line protection unit are resistors with fixed resistance, but not limited thereto, and the resistors may be variable resistors. Therefore, it is possible to change the circuit design parameters easily, which enhances the expansibility of the circuit.

In addition, the first switching element and the second switching element in the above embodiments and modified examples are FET transistors, but not limited thereto, and they may also be bipolar transistors such as triodes. As long as it mainly has the functions of the first switching element and the second switching element, it may be a module having a switching function formed by combining a plurality of elements.

The above-described vehicle-mounted device has an operation control function, a display function and a screen vibration function, but not limited thereto. The present disclosure can be applied as long as there are a plurality of power sources and a plurality of ground wires as described above. In addition, it may be various devices such as a vehicle-mounted display device.

The invention claimed is:

1. A protection circuit comprising:
a first substrate comprising a first circuit connected to a power line and a potential reference line;
a second substrate comprising a second circuit connected to the power line and the potential reference line;
a connecting part comprising:
a potential reference connecting line configured to provide a connection between the potential reference line of the first substrate and the potential reference line of the second substrate, and
a communication connecting line configured to provide a connection between a communication line of the first circuit and a communication line of the second circuit;
a current limiting unit disposed between a first node on the potential reference line of the first substrate at the connecting part side and a second node on the potential reference line of the first substrate at the first circuit side; and
a communication line protection unit configured to limit voltages applied to the communication line of the first circuit and the communication line of the second circuit when current limiting is conducted by the current limiting unit, the communication line protection unit comprising:
a first switching unit and a second switching unit, where one end of each of the first switching unit and the second switching unit is connected to the potential reference connecting line and another end of each of the first switching unit and the second switching unit is connected to the communication connecting line; and
a resistor connected to the communication connecting line between the other end of the first switching unit and the other end of the second switching unit,
wherein the one end of the first switching unit and the one end of the second switching unit are each connected to a respective end of the current limiting unit.

2. The protection circuit according to claim 1, wherein:
the current limiting unit comprises a damping resistor or a damping resistor and a capacitor connected in parallel with the damping resistor.

3. The protection circuit according to claim 1, wherein the current limiting unit is connected in series with the potential reference connecting line.

4. The protection circuit according to claim 1, wherein the communication line protection unit further comprises a resistor connected to the communication connecting line between the other end of the first switching unit and the other end of the second switching unit.

5. The protection circuit according to claim 1, wherein:
the first switching unit comprises a first switching element and a first diode connected in series with the first switching element; and
the second switching unit comprises a second switching element and a second diode connected in series with the second switching element.

6. The protection circuit according to claim 1, wherein:
the first switching element and the second switching element are transistors, and
the first diode and the second diode are Zener diodes.

7. The protection circuit according to claim 6, wherein:
a gate electrode of the first switching element is connected to the potential reference connecting line at one end of the damping resistor, a source electrode of the first switching element is connected to the potential reference connecting line at another end of the damping resistor, and a drain electrode of the first switching element is connected to the communication connecting line via the first diode;
a gate electrode of the second switching element is connected to the potential reference connecting line at the other end of the damping resistor, a source electrode of the second switching element is connected to the potential reference connecting line at the one end of the damping resistor, and a drain electrode of the second switching element is connected to the communication connecting line via the second diode;
the first diode is forward connected between the drain electrode of the first switching element and the communication connecting line; and
the second diode is forward connected between the drain electrode of the second switching element and the communication connecting line.

8. A vehicle-mounted device comprising the protection circuit according to claim 1.

* * * * *